United States Patent Office

3,752,686
Patented Aug. 14, 1973

3,752,686
PROCESS FOR THE CONVERSION OF PERYLENE-3,4,9,10 - TETRACARBOXYLIC ACID DIIMIDE INTO A FORM SUITABLE AS PIGMENT DYE-STUFF

Dietmar Kalz, Cologne, Karlheinz Wolf, Leverkusen, Gerhard Wolfrum, Bergisch-Neukirchen, and Reinhold Hornle, Cologne, Germany, assignors to Bayer Aktiengesellschaft, Leverkusen, Germany
No Drawing. Filed Dec. 23, 1971, Ser. No. 211,681
Claims priority, application Germany, Dec. 24, 1970,
P 20 63 714.3
Int. Cl. C08h 17/14
U.S. Cl. 106—288 Q          3 Claims

ABSTRACT OF THE DISCLOSURE

Perylene - 3,4,9,10-tetracarboxylic acid diimide is obtained in a brilliant, deeply coloured, light- and weather-fast pigment form by salt grinding in the presence of 1–30% of higher aliphatic amines.

---

From German patent specification No. 276,357 there is known the production of perylene-3,4,9,10-tetracarboxylic acid diimide by alkali melt of naphthalene-1,8-dicarboxylic acid imide and subsequent oxidation.

The perylene - 3,4,9,10-tetracarboxylic acid diimide is an unsightly brown substance which, on account of its high hardness of grain, poor dispersibility in organic media, low strength of colour and dull shade, is not suitable as a pigment dyestuff for the colouring of synthetic materials or varnishes.

Only by multi-stage processes, sometimes via a stage involving working in combustible organic solvents, and partly at elevated temperatures, is it possible to convert perylene-3,4,9,10-tetracarboxylic acid diimide into a brilliant pigment of satisfactory strength of colour which, when incorporated in organic varnishes or plastics, has outstanding fastness to light and weather.

For example, it is known from German patent specification No. 1,115,711 first to bring perylene-3,4,9,10-tetracarboxylic acid diimide into a finely divided form according to conventional processes; subsequently to heat the paste obtainable in this way in high-boiling organic solvents while distilling off the solvent of the paste; to boil the mixture under reflux when the boiling point of the high-boiling organic solvent has been reached; and finally to work up.

According to German patent specification No. 1,142,339, a pigment form suitable for colouring organic materials is obtained by finely dividing perylene-3,4,9,10-tetracarboxylic acid diimide by pasting with sulphuric acid and precipitation in water; then intimately mixing it with an oil-soluble polar compound; drying; and subsequently comminuting.

In French patent specification No. 1,580,971 there is described the conversion into a suitable pigment dyestuff by comminuting the starting material by conventional methods and subsequently grinding it in an organic solvent with the aid of quartz beads. Methanol, ethanol, i-propanol, butanol, amyl alcohol, cyclohexanol, acetone, cyclohexanone, dimethyl formamide, ligroin, cyclohexane, toluene, xylene, chlorobenzene, nitrobenzene, carbon tetrachloride and 1,2-dichloroethane are mentioned as organic solvents.

It has now been found that an outstandingly brilliant, deeply coloured, light- and weather-fast perylene-3,4,9,10-tetracarboxylic acid diimide pigment is obtained by carrying out the well-known salt-grinding with the addition of 1–30 percent by weight of higher aliphatic amines. 10–15 percent by weight of these higher aliphatic amines are preferably used. As grinding auxiliaries, there are used the conventional inorganic salts, such as sodium chloride, sodium sulphate or calcium chloride, or mixtures thereof. Good results are achieved when the proportion of perylene-3,4,9,10-tetracarboxylic acid diimide to salt is chosen as 1:1 to 1:20; a proportion of 1:7 to 1:10 proves particularly advantageous. Test results show that satisfactory results are sometimes already obtained after a grinding period of 5 hours; grinding times of over 30 hours are not normally necessary. Good results are obtained with a grinding time of 10–20 hours. Grinding is advantageously carried out in a ball mill. However, it can also be carried out with other grinding aggregates, e.g. in a kneader.

Aliphatic amines which are suitable according to the invention are, for example, 1-amino-n-decane, 1-amino-n-dodecane, 1 - amino-n-tetradecane, 1 - amino-n-hexadecane, 9 - amino-heptadecane mixture with the carbon numbers $C_{15}$–$C_{19}$, 1-amino-n-octadecane, 1-N-methyl-amino-n-octadecane, 1 - N-(n-butylamino)-n-octadecane, bis-(2-ethyl-hexyl)-amine, and mixtures thereof; there are thus used higher aliphatic amines which are substantially insoluble in water.

The working up of the salt-ground perylene-3,4,9,10-tetracarboxylic acid diimide is carried out in the usual way by washing out the inorganic salt with water, drying the dyestuff, and comminuting, for example, in a cross-beater mill.

In comparison with the pigment form obtained according to German "Offenlegungsschrift" (published specification) No. 1,914,208, the pigment form obtainable according to the invention has an appreciably better dispersibility in oragnic varnishes.

Whereas salt-grinding without the addition of amine yields only a dull, weakly coloured pigment, the pigment form obtainable according to the invention is suitable for the pigmentation of varnishes of all kinds; for the production of printing inks distemper or binder colours, for the dyeing in the mass of synthetic, semi-synthetic or natural macromolecular materials, such as e.g. polyvinyl chloride, polystyrene, polyamide, or polyethylene. It can also be used for the spin-dyeing of natural, regenerated or synthetic fibres, such as e.g. cellulose, polyester, polycarbonate, polyacrylonitrile or polyamide fibres, as well as for printing textiles and paper. Furthermore, it is possible to prepare from this pigment form, by grinding or kneading in the presence of nonionic, anionic or cationic tensides, finely divided, stable aqueous pigment dispersions which are suitable, for example, for the pigmentation of emulsion paints and paint colours, for the colouring of paper, for the pigment printing of textiles, or for the spin-dyeing of viscose.

EXAMPLE 1

10 g. of the perylene-3,4,9,10-tetracarboxylic acid diimide prepared according to German patent specification No. 276,357, which is optionally dissolved before grinding in a sulfuric acid of 90–100% and precipitated by addition of 10–20% of water, are ground with 100 g. sodium chloride and 1.5 g. 1-amino-n-dodecane in a ball mill for 19 hours, the salt is dissolved out with water, and the pigment, washed salt-free, is dried at 50° C. in a vacuum or comminuted in a laboratory mill (Starmix). When it is incorporated in organic varnishes, brilliant, deeply coloured reddish violet dyeings of high fastness to light and weather are obtained.

Instead of 1-amino-n-dodecane, there may be added 1-amino-n-decane, 1-amino-n-tetradecane, 1-amino-n-hexadecane, 9-amino-heptadecane mixture $C_{15}$–$C_{19}$, 1-amino-n-octadecane, 1-N-methylamino-n-octadecane, 1-N-(n-butylamino)-n-octadecane or bis-(2-ethyl-hexyl)-amine to the salt grinding, a very valuable pigment with the properties described above being likewise obtained. The sodium chloride may be replaced with sodium sulphate or calcium chloride.

EXAMPLE 2

A mixture of 65 g. polyvinyl chloride, 35 g. diisooctyl phthalate, 2 g. dibutyl tin-mercaptide, 0.5 g. titanium dioxide, and 0.5 g. of the perylene-3,4,9,10-tetracarboxylic acid diimide obtained according to Example 1 are coloured in a roll mill at 165° C. A reddish violet material is obtained, which can serve for the production of foils or moulded bodies. The dyeing is characterised by high fastness to light and migration.

EXAMPLE 3

10 g. of the pigment formed according to Example 1 are ground with a stoving varnish of 25 g. coconut alkyd resin (40% coconut oil), 10 g. melamine resin, 5 g. toluene, and 7 g. glycol monomethyl ether is anautomatic Hoover-Muller grinding machine. The mixture is applied to the substrate to be varnished, the varnish is hardened by stoving at 130° C., and there are obtained brilliant reddish violet varnish coatings of very good fastness to cross-varnishing, light and weather.

We claim:

1. Process for the conversion of perylene-3,4,9,10-tetracarboxylic acid diimide into a pigment form suitable for the colouring of organic materials by salt-grinding, characterised in that 1–30% of higher aliphatic amines are added.

2. Process according to claim 1, characterised by choosing a proportion of perylene-3,4,9,10-tetracarboxylic acid diimide to salt of 1:1 to 1:20 and grinding for about 5–30 hours.

3. The pigment form obtained according to the process of claim 1 for incorporation in organic materials.

References Cited
FOREIGN PATENTS

| 1,080,115 | 8/1967 | Great Britain | 106—308 N |
| 971,044 | 9/1964 | Great Britain | 106—309 |

DELBERT E. GANTZ, Primary Examiner

J. V. HOWARD, Assistant Examiner

U.S. Cl. X.R.

106—308 N, 309